AMPLITUDE CONTROLLED FREQUENCY MODULATED OSCILLATOR

Filed Jan. 3, 1961 4 Sheets-Sheet 1

LEON F. EDELSON
INVENTOR.

BY [signature]
ATTORNEY

March 10, 1964 L. F. EDELSON 3,124,766

AMPLITUDE CONTROLLED FREQUENCY MODULATED OSCILLATOR

Filed Jan. 3, 1961 4 Sheets-Sheet 2

LEON F. EDELSON
*INVENTOR.*

*BY* [signature]

ATTORNEY

March 10, 1964 L. F. EDELSON 3,124,766

AMPLITUDE CONTROLLED FREQUENCY MODULATED OSCILLATOR

Filed Jan. 3, 1961 4 Sheets-Sheet 3

LEON F. EDELSON
*INVENTOR.*

*BY* Reed C. Lawlor
ATTORNEY

AMPLITUDE CONTROLLED FREQUENCY MODULATED OSCILLATOR

Filed Jan. 3, 1961

4 Sheets-Sheet 4

LEON F. EDELSON
*INVENTOR.*

BY [signature]
ATTORNEY 3,124,766

AMPLITUDE CONTROLLED FREQUENCY MODULATED OSCILLATOR

Leon F. Edelson, Los Angeles, Calif., assignor to United Electrodynamics, Inc., Pasadena, Calif., a corporation of California Filed Jan. 3, 1961, Ser. No. 80,247
14 Claims. (Cl. 332—19)

This invention relates to improvements in oscillators and more particularly to improvements in frequency modulated oscillators employed in the art of telemetering.

BACKGROUND

The present invention relates especially to frequency modulated oscillators of the type in which the magnitude of an oscillatory signal fed back through a feedback circuit is controlled in accordance with a control or driving signal applied from an external source. Such a driving signal may be in the form of a D.C. control current supplied from an external source. Or the driving signal may be in the form of a mechanical force which controls a variable impedance located in the feedback circuit in accordance with the magnitude of the force. In any event, an oscillatory signal fed back through the feedback circuit is applied to the input of the oscillator to cause the oscillator to vary in frequency in accordance with the magnitude of the driving signal. In the past, the signal fed back has been applied about 90° out of phase or at least at some large angle greater than 45° relative to the phase of the signal present at the input of the oscillator.

INTRODUCTION

In certain embodiments of the present invention, specifically disclosed hereinafter, a parallel resonant circuit is employed at the input of the oscillator and the input voltage across this parallel resonant circuit is controlled or regulated or limited in such a way that it is of constant amplitude; and, in addition, an amplitude-modulated oscillatory signal voltage is fed back through the feedback circuit into one of the branch circuits in phase with that input voltage. In these embodiments of the invention herein the resonant circuit consists of an inductive branch and a capacitive branch connected in parallel and the modulating voltage is applied in series with the voltage across the reactants in at least one of these branches. In addition, the oscillator amplifier has a constant gain and the amplitude of the signal voltage at the input of the oscillator is controlled by limiting the voltage appearing at the output of the oscillator to a predetermined value.

By virtue of the voltage-limiting action on the input and the combined action of the resonant circuit and the amplitude-modulated feedback arrangement, the frequency of oscillation of the amplifier is varied in accordance with the amplitude of the amplitude-modulated signal and hence in accordance with the driving signal which causes the amplitude modulation. By applying the modulating voltage in the same or opposite phase with the voltage across the reactive element instead of at about 90° out of phase relative thereto, an oscillator having a higher degree of linearity and a high stability can be produced.

Looked at more broadly, according to the present invention a reactive element is included in the input of the oscillator amplifier and the amplitude-modulated voltage wave fed back through the modulating loop is applied to the input of the oscillator amplifier in series with the voltage appearing across the reactive element and in the same or opposite phase therewith. Also in accordance with this invention the total voltage developed by the oscillator across the input is controlled, such as by regulation or limitation, in such a way that it has a constant amplitude of oscillation. In order to make oscillation possible, another reactive element is included in the oscillator for tuning the oscillator to such a frequency that the change in voltage developed across the reactive element at the input compensates for the change in voltage of the amplitude-modulated wave that is applied to the input in such a way as to maintain the input voltage constant. In accordance with this invention, by virtue of the fact that the amplitude of the voltage generated at the input of the oscillator is constant, the frequency of the current flowing through the reactive element adjusts itself automatically in accordance with the magnitude of the control signal, thus causing the frequency of the oscillator to be modulated in accordance with the magnitude of the control signal.

Though the invention is described hereinafter with reference to particular embodiments thereof it will be understood that it may be embodied in many other forms within the scope of the claims. Furthermore, as will become apparent from the following description, the invention includes other features and has other advantages in addition to those set forth above.

The invention is first described with reference to the embodiment thereof illustrated in FIG. 1. Thereafter it is described with reference to the alternative embodiment illustrated in FIGS. 4, 7, and 10. And finally, it is described with reference to a detailed wiring diagram of a specific embodiment of the invention represented in FIG. 11.

DETAILED DESCRIPTION

*Inductor Feedback Form*

Figures 1, 4:
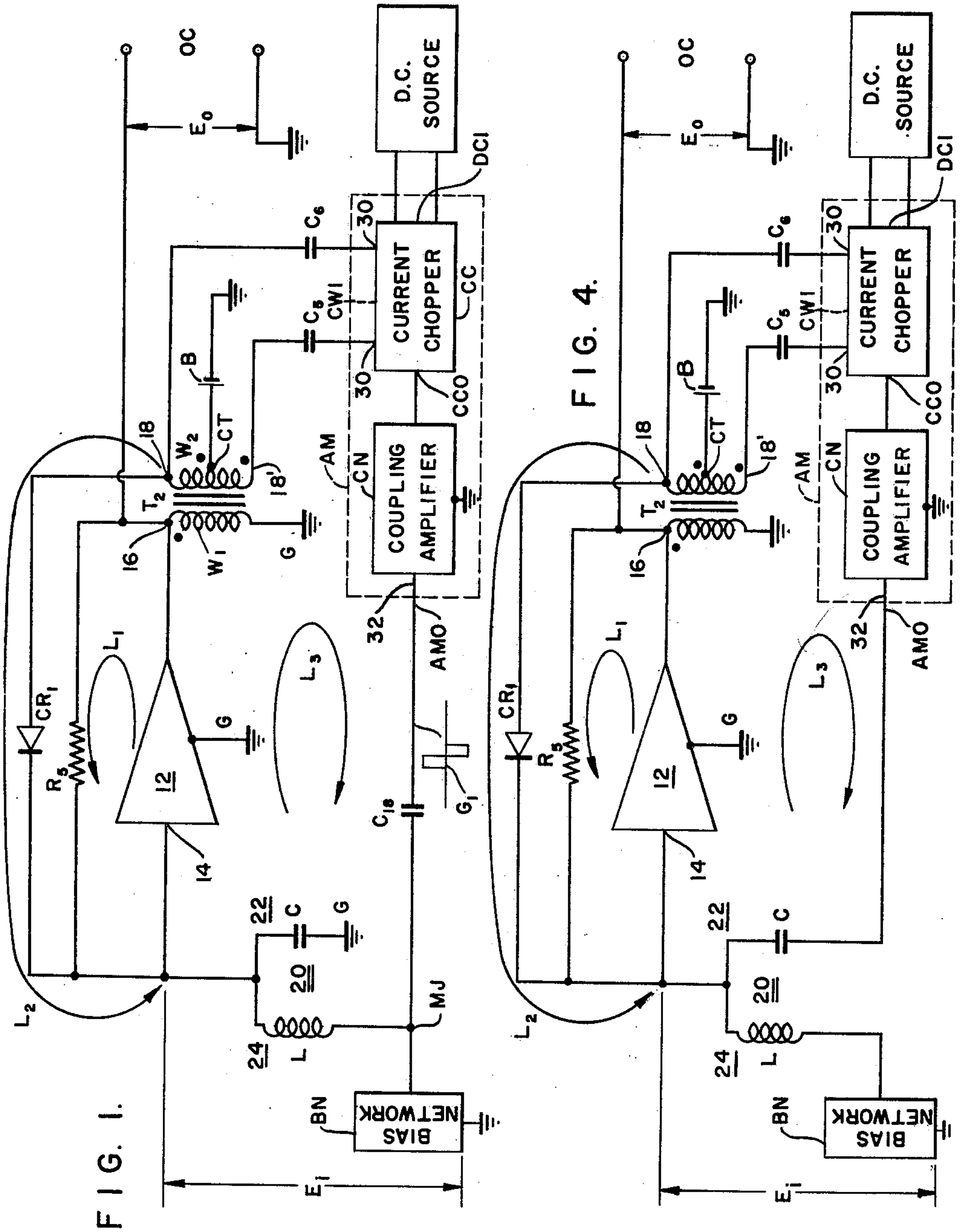
FIG. 1 is a schematic diagram of an oscillator employing this invention.
FIGS. 4, 7, 10 and 11 are schematic diagrams of alternative embodiments of the invention.

The oscillator of FIG. 1 employs an oscillator amplifier 12 together with three feedback circuits that form three feedback loops, $L_1$, $L_2$ and $L_3$. The loop $L_1$ is a positive feedback loop employed to initiate and generate oscillations. The feedback loop $L_2$ is a negative feedback loop that is employed to limit the amplitude of the oscillations. The feedback loop $L_3$ is a modulation loop that is employed to modulate the frequency of the oscillations in accordance with the magnitude of a driving signal. As previously mentioned, a reactive element is connected in the input and a modulating signal having an amplitude dependent upon the magnitude of the driving signal is fed back to the input in series with the voltage developed across the input reactance.

The oscillator amplifier 12 itself has a constant amplification factor such as +4. The constancy of amplification is achieved by employing an amplifier which includes a negative feedback circuit internally of the amplifier. Such an amplifier is described hereinafter. The amplifier is provided with an input terminal 14, a main output terminal 16, auxiliary output terminals 18 and 18′, and a ground terminal G.

A parallel resonant circuit 20 comprising a capacitive branch 22 and an inductive branch 24 is connected between the input terminal 14 and ground G. The capacitive circuit 22 includes only a capacitor C. The inductive branch includes an inductor L.

The output circuit is provided by a transformer $T_2$. The primary winding $W_1$ of the transformer is connected between the main output terminal 16 and the ground terminal G. The secondary winding is center tapped being divided into two parts by means of a center tap CT. The center tap is connected to the positive terminal of a battery B, the negative terminal of which is grounded. The two terminals of the secondary winding provide the auxiliary output terminals 18 and 18′ of the oscillator amplifier. As indicated by the dots associated with the windings of the transformer $T_2$, the signal developed at the auxiliary output terminal 18′ is in phase with the signal developed at the main output terminal 16, while the signal developed at the auxiliary output terminal 18 is of a phase opposite to that of the signal developed at the main output terminal 16. The frequency-modulated signal developed by the oscillator is provided across an output circuit OC connected between the main output terminal 16 and ground.

The positive feedback loop $L_1$ is completed by means of a feedback resistor $R_5$ connected between the main terminal 16 and the input terminal 14.

The feedback loop $L_2$ includes a diode $CR_1$ that has its cathode connected to the input terminal 14 and its anode connected to the auxiliary output terminal 18.

The feedback loop $L_3$ includes an amplitude modulator AM having a carrier wave input CWI, an amplitude modulated output AMO and a D.C. current input DCI. The carrier wave input CWI is supplied by the output of the oscillator. In this case the driving signal is a D.C. modulating signal applied from an external D.C. source to the D.C. input DCI. The resulting amplitude modulated wave is applied from the amplitude modulated output AMO to a junction MJ between the inductor 24 and the bias network BN. The impedance looking into this bias network from the junction MJ is large compared with the impedance looking into the output AMO of the amplitude modulator AM from this junction MJ.

The oscillator so formed oscillates at a frequency determined not only by the characteristics of the parallel resonant network 20 but also by the amplitude of the modulating voltage applied between the junction MJ and ground G as explained more fully hereinafter. In this oscillator the input voltage $E_1$ is generated at the input between the input terminal 14 and the ground G. Similarly, an output voltage $E_o$ is generated across the main output terminal 16 and ground G. The amplitude of oscillation is determined by the voltage of battery B and the voltage supplied by the bias network BN acting in series on the feedback diode $CR_1$. Though the modulating signal supplied by the amplitude modulator AM to the input of the oscillator amplifier 12 is amplitude modulated, the signal developed at the input is of constant amplitude. However, the frequency of oscillation is a function of the amplitude of the driving signal. As previously indicated, the ratio of the output voltage $E_o$ to the input $E_1$ is maintained constant by virtue of the constancy of amplification of the amplifier 12. For this reason, the voltage at the output OC is also of constant amplitude. But it is frequency modulated.

The modulator employs a current chopper CC having a carrier wave input CWI and a D.C. control current input DCI. The output CCO of the current chopper CC is connected through a coupling or chopper amplifier CN to the output AMO of the amplitude modulator AM. The two terminals 30, 30 of the carrier wave input CWI are connected through isolation capacitors $C_5$, $C_6$ to the opposite ends of the secondary winding $W_2$ of the output transformer $T_2$. The modulator output AMO is provided by a modulator terminal 32 and the ground terminal G. The modulator loop $L_3$ is completed by means of an isolation capacitor $C_{18}$ connected between the modulator output terminal 32 and the modulation junction MJ. The current chopper CC of the amplitude modulator AM may be of the type described by N. F. Moody in Proc. National Electronics Conference, Vol. 11, 1955, at pages 441–454. The coupling network CN of the amplitude modulator AM is of a type which has a low input impedance, a low output impedance and a stable transfer impedance. For this purpose the term "transfer impedance" is defined as the ratio of the output voltage to the input current.

With the amplitude modulator AM so connected and with the oscillator oscillating a square wave signal represented by the graph $G_1$ is generated at the modulator output AMO. This square wave voltage signal has a fundamental frequency equal to that of the oscillator and an amplitude that is proportional to the magnitude of the D.C. current applied to the modulator input DCI. The amplitude of the square wave voltage signal developed at the output AMO of the amplitude modulator is proportional to the current fed into the D.C. input DCI.

*Theory of Operation of Form 1*

Before considering the effect of feeding signals back to the input through the modulation loop $L_3$, let us first consider the operation of the circuit in the absence of a signal fed back through the modulation loop. For this purpose, if desired, it may be assumed that the connection between the modulation output terminal 32 and the modulation capacitor $C_{18}$ has been disconnected from the terminal 32 and has been connected to ground. In other words, since under the assumed condition, no signal appears at terminal 32, this terminal can be considered grounded. Under these circumstances, the positive feedback action in the loop $L_1$ causes oscillation. The gain in the loop is made sufficiently large to assure such oscilation, in accordance with well-known principles. The frequency of oscillation is determined by the resonant frequency of the parallel resonant network 20. In practice the resistance of the elements in the parallel resonant circuit is small and the resistance of the external circuit looking out of the resonant circuit and into the input of the amplifier 12 is high. Under these circumstances, the resonant frequency $f_0$ is determined by the formula $$\omega_0=\frac{1}{\sqrt{LC}} \tag{1}$$

where $$\omega_0=2\pi f_0 \tag{2}$$

The amplitude of oscillation is determined by the feedback diode $CR_1$. This diode has a back bias that is determined by the bias network BN and the battery B while the amplitude of oscillation is small, but a forward bias when the amplitude of oscillation becomes large. Thus, the diode $CR_1$ has the effect of producing a low negative feedback action in the loop $L_2$ while the oscillation amplitude is low and a high feedback action when the amplitude of oscillation is large. As a result, the diode $CR_1$ prevents the amplitude of oscillation in the output from exceeding a predetermined value as determined by the back-bias on the diode. In order to render the diode effective for limiting the amplitude of the output signal the circuit constants of the various elements and the back-bias are so proportioned that the output voltage just exceeds the back-bias on the diode during operation.

From the foregoing explanation it is clear that regardless of the frequency of oscillation the amplitude of the output voltage $E_o$ is always substantially constant regardless of the frequency of oscillation. Likewise, the input voltage $E_i$ is always substantially constant regardless of the frequency oscillation. Such constancy is achieved partly by the effect of the back-bias on the diode $CR_1$ in the non-linear negative feedback loop $L_2$ and partly by the fact that the amplification of the amplifier 12 is constant.

Figure 2:
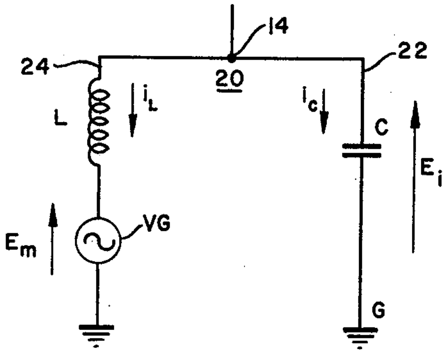
FIGS. 2, 3, 5, 6, 8, and 9 are graphs and schematic circuits employed in explaining the operation of various forms of the invention.

Considering only the alternating current properties of the circuit, for purposes of analysis the parallel input circuit 20 may be represented in simplified form in the manner shown in FIG. 2. Here it will be noted that the modulation signal $E_m$ is represented by a voltage generator VG connected in series with the inductor L in the input circuit 20 of the amplifier. Because of the action of the amplifier 12 and the non-linear negative feedback circuit in the loop $L_2$ the amplitude of the oscillating voltage $E_i$ developed across the parallel resonant circuit 20 is constant. For purposes of simplifying the analysis, the only component of the square wave modulating signal that needs to be considered is the component having the frequency of oscillation. This frequency $f$ differs from the frequency $f_0$ that exists in the absence of any modulating signal fed back through the loop $L_3$ by an amount that depends on the magnitude of the driving signal.

In this oscillator, therefore, the amplitude of the oscillating voltage existing across the input circuit is always constant even though the amplitude of the voltage provided by the generator VG in the inductive branch varies with the magnitude of the D.C. current supplied to the control input DCI of the modulator. In this circuit a current $i_C$ flows from the input terminal to ground G through the capacitor C and a current $i_L$ flows from the input terminal 14 through the inductor 24 and generator VG to ground. These two currents are of opposite phase and almost of the same amplitude. Assuming for simplicity that the sum of these currents is zero regardless of the magnitude of the modulating voltage $E_m$, it may be readily shown that the resonant frequency $f$ of oscillation is determined by the formula $$\frac{\omega}{\omega_0}=\sqrt{1-E_m/E_i} \qquad (3)$$

where $$\omega=2\pi f \qquad (4)$$

Figure 3:
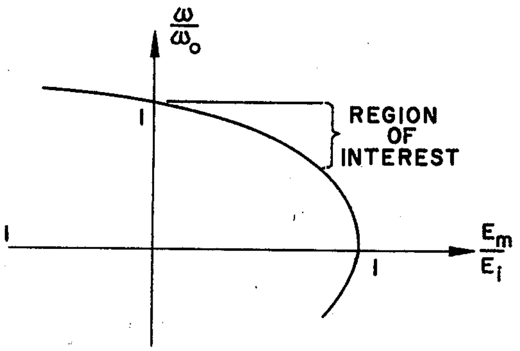

A universal curve showing how the ratio $\omega/\omega_0$ varies as a function of the ratio $E_m/E_i$ is shown in FIG. 3. This graph is a parabola. It will be noted that so long as the modulating voltage $E_m$ is small compared with the input voltage $E_i$ the frequency of oscillation is nearly a linear function of the modulating voltage. By establishing the phase of the modulating voltage equal to that of the input signal $E_i$, the frequency of oscillation decreases as the amplitude of the control current increases. On the other hand, by establishing the phase of the modulating voltage opposite to the phase of the input voltage, the frequency of oscillation increases as the magnitude of the D.C. current increases. Though the frequnency of oscillation is a more linear function of control current in the latter case than in the former case, in practice the circuit is operated with the modulating voltage in phase with the input voltage in order to meet the practical standard that has been adopted throughout the telemetering industry, according to which an increase in stimulus is required to cause a decrease in frequency. In the case described herein it is assumed that the driving signal increases as the stimulus is increased.

*Capacitor Feedback Form*

In another embodiment of the invention illustrated in FIG. 4 the output of the amplitude modulator is fed to the capacitive branch of the parallel resonant circuit instead of to the inductive branch. With this arrangement, as indicated in FIG. 4, the capacitor C is not only used as a capacitive element of the parallel resonant network but also serves to isolate the output of the amplitude modulator AM from the input of the amplifier. In this case the separate coupling capacitor $C_{18}$ is omitted.

Figure 5:
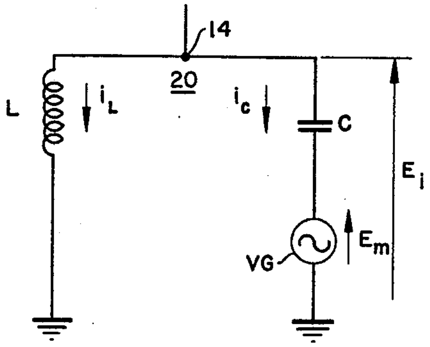

The circuit of FIG. 4 may be analyzed by means of the diagram shown in FIG. 5. An analysis of this circuit shows that the frequency of oscillation is determined by the equation $$\frac{\omega}{\omega_0}=\frac{1}{\sqrt{1-E_m/E_i}} \qquad (5)$$

Figure 6:
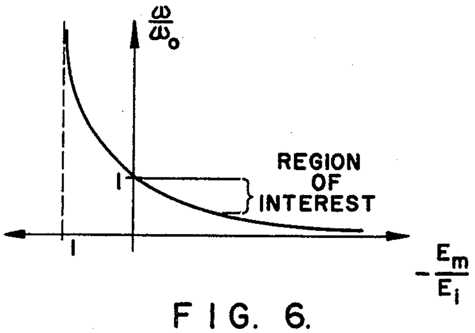

In this case, FIG. 6 represents a universal graph showing how the ratio $\omega/\omega_0$ varies with the ratio $E_m/E_i$. In this graph negative values of $E_m/E_i$ are to the right of the origin and positive values to the left, just the opposite of the conventional graphical arrangement employed in FIG. 3.

*Compound Feedback Form*

It will be noted that the graph of FIG. 3 is convex upward while the graph of FIG. 6 is concave upward in the region of interest, that is in the region in which the frequency drops in response to an increase in stimulus. By applying the output of the amplitude modulator to both branches of the parallel resonant circuit partial compensation of these non-linearity characteristics may be achieved. A circuit for accomplishing such compensation is shown in FIGS. 7 and 10.

Figures 7, 10:
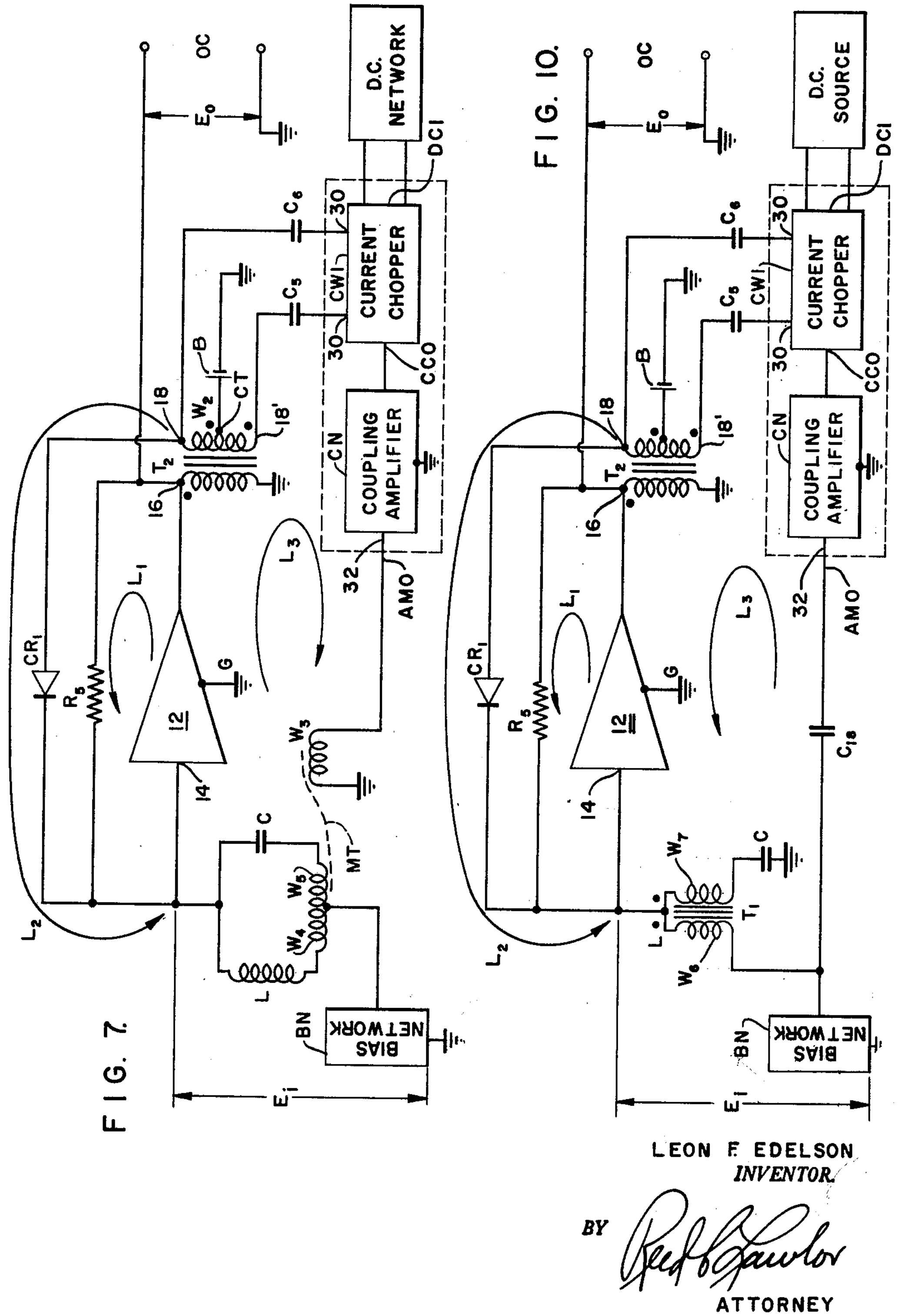

In the circuit of FIG. 7, a modulation transformer having a split secondary winding is employed for feeding the modulating voltage into the two branches of the parallel resonant circuit in different proportions. These proportions are selected to maximize the linearization of the frequency deviation as a function of D.C. control current supplied to the input DCI. More particularly, a modulation transformer MT is employed having a primary winding $W_3$ connected in the output AMO of the amplitude modulator and a secondary having a pair of windings $W_4$ and $W_5$ connected in the reactive and capacitive branches respectively of the parallel resonant network. The tap between he two secondary windings $W_4$ and $W_5$ is connected to the ground terminal G. The ratio of the number of turns of the secondary winding $W_5$ to the secondary winding $W_4$ is N. The phase is such that the voltage injected by the winding $W_4$ into the inductive branch network is in phase with the input voltage $E_i$, and the voltage injected into the capacitive branch is of the opposite phase.

Figure 8:
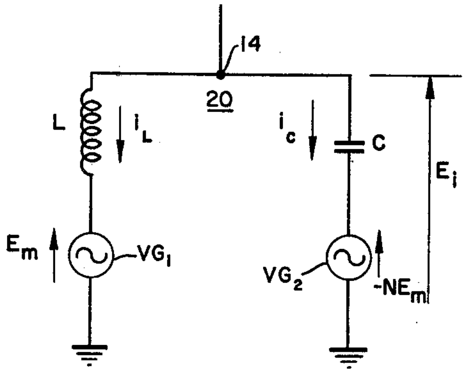

A schematic diagram that may be used for analysis of this circuit is shown in FIG. 8. Here it will be noted that a signal having an amplitude $E_m$ is supplied by a voltage generator $VG_1$ connected in series wtih the inductor L and a voltage $-NE_m$ is supplied by a second voltage generator $VG_2$ connected in the capacitive branch. Analysis of this circuit shows that the resonant frequency is determined by the formula $$\frac{\omega}{\omega_0}=\sqrt{\frac{1-E_m/E_i}{1+N(E_m/E_i)}} \qquad (6)$$

Figure 9:
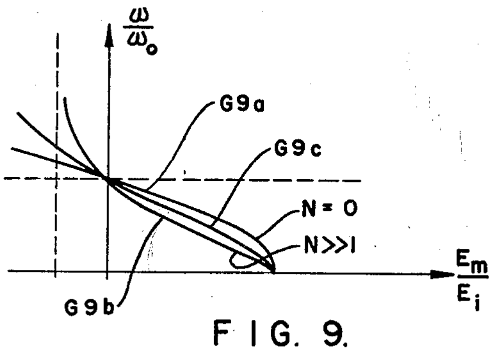

In FIG. 9 there are shown three graphs corresponding to three values of the turns ratio N. Graph G9*a* shows how the resonant frequency varies with the modulating voltage when N equals 0. This curve, which is convex upwardly, corresponds to the results obtained when the modulating voltage is injected into the inductive branch only. Graph G9*b* shows how the resonant frequency varies with the modulating voltage when N is very large compared with 1. This curve, which is concave upwardly, corresponds somewhat to the results obtained when the modulating voltage is injected into the capacitive branch only. Graph G9*c* shows how the resonant frequency varies with the modulating voltage when N equals some intermediate value. The specific intermediate graph corresponds to a case where an extremely high degree of linearity is achieved. The corresponding optimum ratio $N_L$ corresponding to maximum linearity could be determined mathematically. However, in practice it is more easily determined empirically. A ratio $N_L=0.27$ produces a very high degree of linearity over a 30% range of frequency.

In FIG. 10 there is illustrated another circuit arrangement for feeding modulating signals into both the inductive branch and the capacitive branch. In this case, the output of the amplitude modulator AM is fed into the inductive branch in the same way as shown in FIG. 1. However, in this case the inductor L is formed by a primary winding $W_6$ of a transformer $T_1$ that has a secondary winding $W_7$ connected in series with the capacitors C in the capacity branch. Designating the turns ratio of the windings $W_7$ and $W_6$ by the symbol N it can be shown that the resonant frequency of the circuit is determined by the formula $$\frac{\omega}{\omega_0}=\sqrt{\frac{1-E_m/E_i}{1+\frac{N}{1-N}E_m/E_i}} \quad (7)$$

Since Equation 7 has the same form as Equation 6 except for the fact that N of Equation 6 has been replaced by $N/(1-N)$ in FIG. 7, the same graphs of FIG. 9 may also be used to represent the manner in which the resonant frequency of the circuit of FIG. 10 varies as a function of modulating voltage provided that account is taken of the change in the parameter from N to $N/(1-N)$. In this case, too, the linearity of frequency deviation in terms of input current may be maximized for a specified range of frequencies.

PRACTICAL EXAMPLE

It will be clear from the foregoing explanation that this invention may be practiced in many different ways. In order to assist those skilled in the art to practice the invention, a practical example of one embodiment of the invention has been illustrated in FIG. 11. This practical example represents a specific embodiment of the form of invention represented in FIG. 10.

Figure 11:
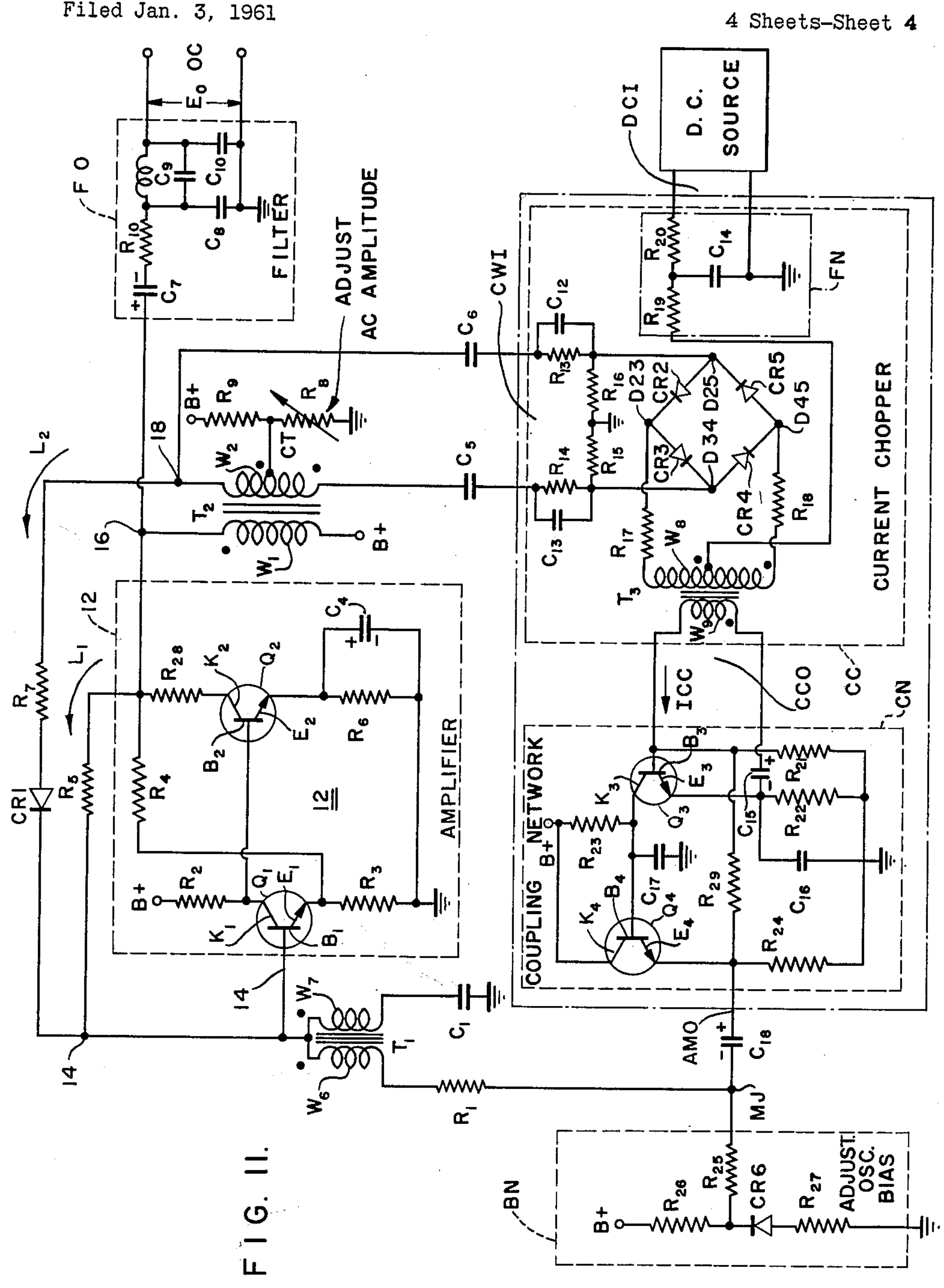

The amplifier 12 of the frequency modulated oscillator of FIG. 11 is formed by a two-stage transistorized amplifier, including an input transistor $Q_1$ and an output transistor $Q_2$. D.C. voltage is supplied from a positive terminal B+ to the collector $K_1$ of the input transistor through a resistor $R_2$. The emitter $E_1$ of the input transistor $Q_1$ is connected to ground through a feedback resistor $R_3$. The base $B_1$ of the input transistor $Q_1$ is biased by means of a biasing circuit which is described in more detail hereinafter. Positive voltage is applied to the collector $K_2$ of the output transistor $Q_2$ from the B+ terminal through the primary winding $W_1$ of the output transformer $T_2$ and a resistor $R_{28}$, the resistor $R_{28}$ being connected between the main output terminal 16 of the oscillator and the collector $K_2$. The emitter $E_2$ of the output transistor $Q_2$ is connected to ground through a resistor $R_6$. This resistor is shunted by means of a stabilizing by-pass capacitor $C_4$. The feedback resistor $R_4$ of the feedback loop $L_2$ is connected between the oscillator output terminal 16 and the emitter $E_1$ of the input transistor $Q_1$.

The resistors $R_3$ and $R_4$ establish an internal negative feedback connection from the output of the oscillator amplifier 12 to the input of the oscillator amplifier, thus establishing the gain of the oscillator amplifier 12 at a predetermined value. The negative feedback also renders the input impedance looking into the base $B_1$ very high and the output impedance looking into the terminal 16 low.

The positive feedback loop $L_1$ includes a resistor $R_5$ connected between the main oscillator output terminal 16 and the base $B_1$ of the input transistor. A parallel resonant network 20 forming part of the positive feedback loop $L_1$, is connected in the input circuit. As previously described in connection with FIG. 10, the primary winding $W_6$ of a transformer $T_1$ is connected in an inductive branch, while the winding $W_7$ is connected in a capacitive circuit. The upper ends of the windings $W_6$ and $W_7$ of the transformer $T_1$ are connected to the base $B_1$ of the input transistor $Q_1$. The lower end of the winding $W_6$ is connected to the biasing network BN, this connection being made through a resistor $R_1$ to the junction MJ. The lower end of the secondary winding $W_7$ is connected through a tuning capacitor $C_1$ to ground. The polarity is such that the voltages developed at the ends of the primary windings remote from the input terminal 14 are in the same phase as viewed from that terminal.

The biasing network is formed by a Zener diode $CR_6$ that includes a cathode connected to the B+ terminal through a resistor $R_{26}$ and an anode that is connected to ground through an adjustable resistor $R_{27}$. The cathode of the Zener diode $CR_6$ is also connected to the junction MJ through an isolation resistor $R_{25}$.

The signal limiting feedback loop $L_2$ includes not only the amplitude-limiting diode $CR_1$, but also a current-limiting resistor $R_7$ connected in series with the diode $CR_1$ between the auxiliary output terminal 18 and the input terminal 14 of the oscillator. To provide the desired bias voltage to the diode $CR_1$ the center tap CT of the secondary winding $W_2$ of the output transformer $T_2$ is connected to the point of a potential divider. The potential divider is provided by the resistors $R_8$ and $R_9$ connected in series between ground and the B+ terminal in the order named.

The value of the resistor $R_{27}$ is made adjustable in order to vary the bias on the base $B_1$ of the input transistor $Q_1$ and also the bias applied to the cathode of the amplitude-limiting diode $CR_1$. The resistor $R_8$ is made adjustable in order to vary the voltage applied to the anode of the amplitude-limiting diode $CR_1$. The cathode of the diode $CR_1$ is made positive relative to the anode, thus back-biasing this diode in the absence of oscillation. The magnitude of the back-bias voltage thus provided determines the maximum amplitude through which the oscillating output voltage appearing at the auxiliary terminal 18 is limited. This amplitude may be varied by adjusting the value of either resistor $R_8$ or $R_{27}$ or both.

As previously mentioned, the current chopper CC of the amplitude modulator AM may be of the type described by N. F. Moody (supra). In the current chopper CC illustrated in FIG. 11, four diodes $CR_2$, $CR_3$, $CR_4$, and $CR_5$ are connected in sequence in a bridge or ring. The cathode of each diode is connected to the anode of the next diode in the ring. A pair of diagonally opposite junctions $D_{25}$ and $D_{34}$ are connected to the carrier wave input $CW_1$. The diagonal terminal $D_{25}$ is located between the diode $CR_2$ and $CR_5$. This diagonal terminal $D_{25}$ is connected to the capacitor $C_6$ through a parallel network consisting of a resistor $R_{13}$ and a capacitor $C_{12}$. The diagonal terminal $D_{34}$ is located between the diode $CR_3$ and $CR_4$. This diagonal terminal is connected to the capacitor $C_5$ through a parallel network consisting of a resistor $R_{14}$ and a capacitor $C_{13}$. A pair of resistors $R_{15}$ and $R_{16}$ are connected in series across the two diagonal terminals $R_{25}$ and $D_{34}$. The center tap between the pair of resistors $R_{15}$—$R_{16}$ is grounded.

The bridge includes two additional diagonal terminals $D_{23}$ and $D_{45}$. The diagonal terminal $D_{23}$ is located at the junction between the diode $CR_2$ and $CR_3$. The diagonal terminal $D_{45}$ is located at the junction between the two diodes $CR_4$ and $CR_5$. The two diagonals $D_{23}$ and $D_{45}$ are connected through resistors $R_{17}$ and $R_{18}$ to the ends of a primary winding $W_8$ of a transformer $T_3$. The center tap of this primary winding is connected through a filter network FN to the terminals of the D.C. input DCI. The filter network FN includes a pair of resistors $R_{19}$ and $R_{20}$ connected in series between the center tap of the winding $W_8$ and the ungrounded terminal of the DC input DCI. One end of a shunt capacitor $C_{14}$ is connected to the junction between the two series resistors $R_{19}$ and $R_{20}$.

The other side of the capacitor $C_{14}$ is grounded. This filter network FN serves to isolate the D.C. input DCI from the current chopper so far as A.C. is concerned, thus preventing signals of oscillating frequency or harmonies thereof from being fed back by the current chopper to the D.C. source from which D.C. signals are being applied to the D.C. input DCI.

A secondary winding $W_9$ on the transformer $T_3$ is employed to provide the output CCO for the current chopper. In normal operation of the current chopper, the voltage applied through the carrier wave input CWI across the diagonal terminal $D_{25}$ and $D_{34}$ exceeds the voltage being applied to the center tap of the winding $W_8$ from the D.C. input DCI. Assume, for example, that the voltage applied to the center tap is some tens of millivolts and that the amplitude of the voltage impressed across the terminals $D_{25}$ and $D_{34}$ is one volt. When the terminal $D_{25}$ is positive relative to the terminal $D_{34}$, current flows from the center tap through the upper half of the winding $W_8$ through the diodes $CR_2$ and $CR_3$. But when the diagonal terminal $D_{34}$ is positive relative to the diagonal terminal $D_{25}$, current flows from the center tap through the lower half of the primary winding $W_8$ through the diodes $CR_4$ and $CR_5$. Thus the ring circuit acts as a switch at the frequency of oscillation to cause the current from the D.C. source to flow alternately through the two halves of the primary winding $W_8$ of the transformer $T_3$. This current is stepped up by the transformer $T_3$ to produce a square wave current in the secondary winding $W_9$ of the modulating transformer $T_3$. This current has the same frequency as the signal supplied to the modulator input CWI and is in phase with the signal at the input of the amplifier.

The chopper amplifier CN is in the form of a so-called computer amplifier. The chopper amplifier CN has a high transfer impedance which produces at its output a voltage $E_i$ which bears a fixed ratio to the current ICC supplied to its input from the current chopper CC.

The chopper amplifier CN, comprises an input transistor $Q_3$ and an output transistor $Q_4$. A positive voltage is supplied to the collector $K_3$ of the input transistor $Q_3$ through a resistor $R_{23}$. The emitter $E_3$ of the input transistor $Q_3$ is connected to ground through a resistor $R_{22}$ which is shunted by a capacitor $C_{16}$. The base $B_3$ of the input transistor $Q_3$ is connected to ground through a resistor $R_{21}$.

The collector $K_4$ of the output transistor $Q_4$ is connected directly to the B+ terminal. The emitter $E_4$ of the output transistor $Q_4$ is connected to ground through a resistor $R_{24}$. The base $B_4$ of the output transistor $Q_4$ is connected directly to the collector $K_3$ of the input transistor $Q_3$. A capacitor $C_{17}$ is connected between the base $B_4$ and ground. A feedback network comprising a resistor $R_{29}$ is connected between the emitter $E_4$ of the output transistor $Q_4$ and the base $B_3$ of the input transistor $Q_3$.

The secondary winding $W_9$ of the current chopper CC is connected between the base $B_3$ and the emitter $E_3$ of the input transistor $Q_3$, one end of the secondary winding $W_9$ being connected to the emitter through a D.C. isolation capacitor $C_{15}$. The emitter $E_4$ of the output transistor $Q_4$ is connected through the coupling capacitor $C_{18}$ to the junction MJ. A low pass filter network FO is connected between the main output terminal 16 and the oscillator output OC.

The frequency modulated oscillator represented in FIG. 11 can be designed to oscillate at any one of a large number of frequencies over a wide range. More particularly, the frequencies of oscillation may be established at any desired frequency between 400 c.p.s. and 80,000 c.p.s. A large number of such oscillators may be employed to transmit signals simultaneously over a plurality of telemetering channels that lie in different, non-overlapping frequency ranges. For purposes of illustration, the values of the different circuit elements that may be employed to establish the oscillating frequency at two different values, namely, $F1=2700$ c.p.s. and $F2=80,000$ c.p.s. are set forth in the following table.

| Element | F1=2,700 c.p.s. | F2=80,000 c.p.s. |
|---|---|---|
| R1 | 0 | 47. |
| R2 | 6.81K | 6.81K. |
| R3 | 2K | 2K. |
| R4 | 6.98K | 6.98K. |
| R5 | 44K | 33K. |
| R6 | 2K | 2K. |
| R7 | 1K | 1K. |
| R8 | variable | variable. |
| R9 | 10K | 10K. |
| R13 | 10K | 10K. |
| R14 | 10K | 10K. |
| R15 | 10K | 10K. |
| R16 | 10K | 10K. |
| R19 | 374K | 374K. |
| R20 | 90.9K | 90.9K. |
| R21 | 5.1K | 5.1K. |
| R22 | 5.62K | 5.62K. |
| R23 | 10K | 10K. |
| R24 | 10K | 10K. |
| R29 | 3K | 3K. |
| R25 | 330ω | 330ω. |
| R26 | 4.02K | 4.02K. |
| R27 | variable | variable. |
| C1 | 0.056 μf | 0.0016 μf. |
| C4 | 15 μf | 6.8 μf. |
| C5 | 0.22 μf | 0.1. |
| C6 | 0.22 μf | 0.1 μf. |
| C14 | 0.001 μf | 100 μμf. |
| C16 | 15 μf | 15 μf. |
| C15 | 47 μf | 47 μf. |
| C18 | 47 μf | 47 μf. |
| T1 voltage stepup ratio | 0.17 | 0.17. |
| T2 voltage stepup ratio (across entire secondary). | 2 | 2. |
| T3 current stepup ratio | 7 | 7. |
| W6 | 110 mh | 3.3 mh. |
| CR1-CR5 | IN 252 | IN 252. |
| B+ | 20 v | 20 v. |
| Q1-Q4 | RHEEM RT 7002. | RHEEM RT 7002. |

In practice the value of the resistor $R_5$ is adjusted to the point where oscillation just occurs. Then the value of the resistor $R_5$ is set at 80% of that amount to make certain that the amplitude of the signal fed back through the positive feedback loop $L_1$ is sufficiently large to sustain oscillation. Furthermore, the range of operation of the amplifier is such that neither of the transistors $Q_1$ or $Q_2$ saturates during operation. The amplitude of oscillation is therefore limited solely by the action of the non-linear feedback loop $L_2$ that includes the amplitude limiting diode $CR_1$. For most satisfactory operation, the Q (that is, the ratio of the reactance to the resistance) of the parallel resonance circuit 20 is designed to be high, namely, about 20.

In the circuit shown in FIG. 11, the chopper amplifier CN has low input resistance of about 10 to 20 ohms. The chopper amplifier has a transfer impedance of about 5000 ohms so that a square wave having a peak potential of about 0.35 volt appears in the output AMO of the amplitude modulator when a square wave current of 70 μa. peak is applied to the base of the transistor $Q_3$. The output impedance of the chopper amplifier as viewed from the junction MJ is extremely low so that, in effect, so far as A.C. signals are concerned, the junction MJ is grounded but for the signal $E_m$ supplied to the parallel resonance circuit by the amplitude modulator AM.

While it is theoretically possible to determine the optimum turns ratio of the transformer $T_1$ by mathematical means, in practice this turns ratio is determined experimentally. Typical ratios include 0.15 and 0.30. With such ratios and others it is possible to attain a linearity of ±0.1% even when the total range of frequencies is as much as ±15% of the median frequency. Thus, the embodiment of the invention illustrated in FIG. 11 is especially effective for attaining a high degree of linearity over a wide range.

CONCLUDING REMARKS

In the foregoing description it has been shown that this invention may be practiced in many ways and that many advantages flow from the fact that the signal fed back from the amplitude modulator is applied to a reactive circuit at the input of the oscillator amplifier in synchronism with the signal developed across the reactive element of that circuit, while the amplitude of the signal in that circuit is maintained constant. The invention may be practiced, of course, in many other ways than those specifically described herein. While the amplitude of the oscillating signal has been limited in the circuit described by means of a diode that is back-biased by voltage sources, it will be understood that such limitation may be obtained in other ways. Likewise, though transistorized amplifiers have been described, other types of amplifiers may also be employed. Furthermore, many of the circuit constants may be changed in many ways to meet different conditions and in particular thermally responsive elements may be introduced at different points in order to stabilize the operation of the circuit over a wide temperature range.

While the invention has been described with reference to the frequency modulation of an oscillator in response to a unilateral D.C. input signal, it will be understood that the invention may also be employed where bilateral signals are applied to the input. In any event, the invention may be employed when the frequency of the signal applied to the input DCI is low compared with the frequency of oscillation. Furthermore, if it is desirable to comply with the conventional standard of changing the frequency on only one side of the reference frequency the D.C. input signal may be biased to some average value in order to cause the frequency to deviate on opposite sides from a frequency established by that D.C. bias.

It is, therefore, to be understood that the invention is not to be restricted to the details of the specific embodiments described herein but that it may be practiced in many other forms within the scope of the appended claims.

The invention claimed is:

1. In a frequency modulated oscillator employing:

an amplifier with a positive feedback circuit interconnecting the amplifier output with the amplifier input for generating an oscillatory carrier wave at its output;

a parallel resonant network included in said positive feedback circuit and connected across the input of said amplifier, said parallel resonant network comprising two branch circuits connected in parallel, one of said branch circuits being capacitive and the other inductive.

a modulator circuit having a carrier wave input connected to the output of said amplifier and having a control input for receiving a modulating control signal and also having a modulator output, whereby a modulated carrier wave is generated at said modulator output, said modulated carrier wave having an amplitude that varies in accordance with the magnitude of said control signal;

means for maintaining the amplitude of the oscillation carrier wave developed across the parallel resonant network constant;

and means for feeding said modulated carrier wave into one of said branch circuits in phase with the oscillatory carrier wave developed across said parallel resonant network.

whereby the frequency of the oscillatory wave appearing at the output of said amplifier varies as a function of said control signal.

2. A frequency modulated oscillator as defined in claim 1 in which said amplifier includes a negative feedback circuit for stabilizing the ratio of the amplitude of the carrier wave developed across said output and the carrier wave developed across said parallel resonant network.

3. A frequency modulated oscillator as defined in claim 1 which also includes means for feeding said modulated carrier wave into the other of said branch circuits in phase with said carrier wave developed across said parallel resonant network, the modulated carrier wave being fed into said branch circuits in opposite phase relative to each other.

4. A frequency modulated oscillator as defined in claim 1 including an inductive element connected in said capacitive branch, said inductive element being inductively coupled to said inductive branch circuit.

5. A frequency modulated oscillator comprising the combination of:

an oscillator amplifier including a feedback circuit for causing oscillation;

means including a reactive circuit coupled to said oscillator amplifier for determining a frequency of oscillation, said reactive circuit comprising a reactive element;

means for maintaining the amplitude of total oscillatory signal developed in said reactive circuit at a predetermined constant amplitude;

a modulator circuit connected to the output of said oscillator amplifier and controlled by an external driving signal for generating a modulated carrier wave signal that has an amplitude that is a function of the magnitude of said driving signal;

and means for injecting said modulated carrier wave signal into said reactive circuit in phase with an oscillatory signal that exists in said reactive circuit whereby a total oscillatory signal is developed in said reactive circuit that has an amplitude that is the algebraic sum of the amplitudes of said carrier wave signal and said partial oscillatory signal thereby causing the partial oscillatory signal in said reactive element to vary as a function of said control force whereby the frequency of oscillation also varies as a function of said control force.

6. A frequency modulated oscillator as defined in claim 5 in which said amplifier includes a negative feedback circuit for stablilizing the ratio of the amplitude of the oscillatory signal developed across said output and the oscillator signal developed across said reactive circuit.

7. A frequency modulated oscillator as defined in claim 5 wherein said modulator circuit comprises a current chopper connected to said oscillator amplifier and including a direct current source for supplying a driving signal in the form of a variable direct current to said current chopper whereby said modulated carrier wave signal has an amplitude that is a linear function of the magnitude of said direct current.

8. An oscillator as defined in claim 7 in which said reactive element is inductive and which comprises means including a coupling capacitor connected between said current chopper and said inductive element for feeding said modulated carrier wave into said reactive circuit;

wherein said amplitude maintaining means comprises a diode connected between the output of said amplifier and said reactive circuit; and means connected to the junction between said inductive element and said capacitor for biasing said diode to determine the amplitude of the total oscillator signal developed at the output of said oscillator.

9. In a frequency modulated oscillator comprising an amplifier having input terminals and output terminals and having two branch circuits connected in parallel across said input terminals, one of said branch circuits including an inductor and the other including a capacitor;

a modulator circuit connected to said output circuit and controlled by an external driving signal for generating a modulated carrier wave signal that has an amplitude that is a function of the magnitude of said driving signal; and means for feeding said modulated carrier wave voltage signal into one of said branch circuits in phase with the oscillatory carrier wave voltage that is developed across said branch circuits, whereby the frequency of the oscillatory wave appearing in said output circuit varies as a function of said control signal.

10. In a frequency modulated oscillator comprising an amplifier having a pair of input terminals and a pair of output terminals and having an output circuit coupled to said output terminals:

an input circuit including a resonance determining element across said input terminals;

a modulator circuit connected to said output circuit and controlled by an external driving signal for generating a modulated carrier wave signal that has an amplitude that is a function of the magnitude of said driving signal; and means for feeding said modulated carrier wave signal into said input circuit in phase with and algebraically added to the oscillatory carrier wave signals that appear across said resonance determining element and across said input terminals, whereby the frequency of the oscillatory wave appearing in said output circuit varies as a function of said control signal.

11. In a frequency modulated oscillator comprising an amplifier having a pair of input terminals and a pair of output terminals, one of each pair being grounded:

positive feedback means comprising a nonreactive circuit interconnecting one of said output terminals with one of said said input terminals;

an output circuit coupled to said output terminals;

means interconnecting said output circuit with said input circuit for maintaining the oscillatory signal appearing in said output circuit substantially constant;

two branch circuits connected in parallel across said input terminals, one of said branch circuits including an inductor and the other including a capacitor;

a modulator circuit connected to said output circuit and controlled by an external driving signal for generating a modulated carrier wave signal that has an amplitude that is a function of the magnitude of said driving signal;

means for feeding said modulated carrier wave signal into one of said branch circuits in phase with the oscillatory carrier wave that is developed across said input terminals, whereby the frequency of the oscillatory wave appearing in said output circuit varies as a function of said control signal; and amplitude-clipping means including a diode connected between said output circuit and the ungrounded input terminal for maintaining the amplitude of the oscillatory signal appearing across said input terminals substantially constant while the output signal is being frequency modulated.

12. In a frequency modulated oscillator comprising an amplifier having a pair of input terminals and a pair of output terminals and having an output circuit coupled to said output terminals:

means interconnecting said output circuit with said input circuit for maintaining the oscillatory signal appearing in said output circuit substantially constant;

two branch circuits connected in parallel across said input terminals, one of said branch circuits including an inductor and the other including a capacitor;

a modulator circuit connected to said output circuit and controlled by an external driving signal for generating a modulated carrier wave signal that has an amplitude that is a function of the magnitude of said driving signal;

means for feeding said modulated carrier wave signal into both of said branch circuits in phase with the oscillatory carrier wave that is developed across said branch circuits, whereby the frequency of the oscillatory wave appearing in said output circuit varies as a function of said control signal; and amplitude-clipping means including a diode connected between said output circuit and the ungrounded input terminal for maintaining the amplitude of the oscillatory signal appearing in said output substantially constant while the output signal is being frequency modulated.

13. In a frequency modulated oscillator comprising:

an amplifier having an input and an output and including a resonance determining circuit comprising a resonance-frequency determining element, the combination therewith of a modulator circuit connected to the output of said amplifier and controlled by an external driving signal for generating a modulated carrier wave signal that has an amplitude that is a function of the magnitude of said driving signal;

means for feeding said modulated carrier wave signal into said resonance determining circuit in phase with the oscillatory carrier wave that is developed across said resonance-frequency determining element; and means for maintaining substantially constant the amplitude of the algebraic sum of the oscillatory carrier wave signal appearing across said resonance-frequency element and the modulated carrier wave signal that is fed thereinto, whereby the frequency of the oscillatory wave appearing in said output circuit varies as a function of said control signal.

14. A frequency modulated oscillator as set forth in claim 13 wherein said resonance-frequency determining element is a reactive element.

References Cited in the file of this patent

UNITED STATES PATENTS 2,944,226 Rawlins ---------------- July 5, 1960
2,962,670 Foster et al. ------------ Nov. 29, 1960